United States Patent
Ganor et al.

(10) Patent No.: US 6,473,269 B1
(45) Date of Patent: Oct. 29, 2002

(54) PIEZOELECTRIC DISK LATCH

(75) Inventors: Ze'ev Ganor, Herzelia; Izhak Rafaeli; Alon Avital, both of Haifa, all of (IL)

(73) Assignee: Nanomotion Ltd., Yokneam (IL)

( * ) Notice: Subject to any disclaimer, the term of this patent is extended or adjusted under 35 U.S.C. 154(b) by 0 days.

(21) Appl. No.: 09/701,811

(22) PCT Filed: Jun. 4, 1998

(86) PCT No.: PCT/IL98/00263

§ 371 (c)(1),
(2), (4) Date: Dec. 1, 2000

(87) PCT Pub. No.: WO99/63528

PCT Pub. Date: Dec. 9, 1999

(51) Int. Cl.[7] .............................................. G11B 21/02
(52) U.S. Cl. .................................................. 360/256.3
(58) Field of Search ............................. 360/256, 256.3, 360/105, 77.16, 78.12, 106, 109; 310/328, 323; G11B 21/02

(56) References Cited

U.S. PATENT DOCUMENTS

| | | | |
|---|---|---|---|
| 5,003,422 A | 3/1991 | Sun et al. | |
| 5,341,259 A | 8/1994 | Amirkiai et al. | |
| 5,404,257 A | 4/1995 | Alt | |
| 5,448,436 A | 9/1995 | Albrecht | |
| 5,453,653 A | 9/1995 | Zumeris | |
| 5,495,376 A | 2/1996 | Wasson et al. | |
| 5,543,986 A | 8/1996 | Albrecht | |
| 5,616,980 A | 4/1997 | Zumeris | |
| 5,640,290 A | 6/1997 | Khanna et al. | |
| 5,682,076 A | 10/1997 | Zumeris | |
| 5,712,750 A | 1/1998 | Kim | |
| 5,714,833 A | 2/1998 | Zumeris | |

FOREIGN PATENT DOCUMENTS

| | | | |
|---|---|---|---|
| EP | 0 618 578 | 10/1994 | |
| EP | 0 755 054 | 1/1997 | |
| EP | 0 834 870 | 4/1998 | |
| JP | 11-273277 | * 10/1999 | ........... G11B/21/02 |

* cited by examiner

Primary Examiner—William Korzuch
Assistant Examiner—Christopher R. Beacham
(74) Attorney, Agent, or Firm—Fenster & Company Patent Attorneys Ltd.

(57) ABSTRACT

A latch for locking a drive arm of a disk drive in a parking position comprising: a latch stop having a baffle moveable between an open position and a closed position; and a piezoelectric motor operable to move the baffle between the open and closed positions. When the drive arm is in the parking position it engages the baffle and is prevented from leaving the parking position when the baffle is in the closed position and is not prevented from leaving the parking position when the baffle is in the open position.

14 Claims, 4 Drawing Sheets

PIEZOELECTRIC DISK LATCH

RELATED APPLICATIONS

The present application is a U.S. national application of PCT/IL98/00263, filed Jun. 4, 1998.

FIELD OF THE INVENTION

The invention relates to data storage disk drives and in particular to latching a read/write arm that moves a read/write head over the surface of a magnetic data storage disk.

BACKGROUND OF THE INVENTION

Magnetic disk drives for data storage are an integral part of almost all computers. A conventional magnetic disk drive comprises at least one magnetic data disk on which data bits can be recorded by changing the state of magnetic domains on the surface of the disk. The disk drive also comprises a read/write head, hereinafter referred to as a "data head" for each of the at least one disk for "writing" or "reading" the domains on the disk surface. The data head for a disk is located at one end of a read/write arm, hereinafter referred to as a "drive arm". A drive arm motor moves the drive arm so as to accurately position the data head over different regions of the surface of the disk used for data storage in order to read or write data to these regions. The disk drive comprises a drive frame to which the at least one data disk, drive arm and other parts of the disk drive are mounted.

When in use, the disk is rotated at high speed by a spindle motor. The rotation causes a cushion of air to form between the data head and the disk surface that keeps the data head a small (generally less than a micron), substantially constant, distance from the disk surface. The air cushion thereby prevents direct and possibly damaging contact between the data head and the surface of the disk while the data head moves over the surface of the disk. In effect, the data head glides "frictionless" over the surface of the disk on an air bearing.

When not in use the disk is stationary and the drive arm is rotated into a parking position so that the data head is positioned away from regions of the surface of the disk that are used for data storage. The drive arm is secured in the parking position by a latching device. The latching device prevents an external shock or blow delivered to the disk drive from dislodging the drive arm from the parking position and causing the data head to come into contact with the disk surface while the disk is stationary.

Among prior art latching devices, hereafter referred to as "latches", used to secure a drive arm in a parking position are solenoid latches, magnetic capture latches, inertial latches and vane latches.

Solenoid latches use a solenoid or coil to produce a magnetic field that moves a locking pin or locking arm so as to engage and immobilize a drive arm in a parking position. Solenoid latches are often complicated, large and heavy, and their solenoids or coils must generally be shielded or distanced from the drive arm to prevent the magnetic fields of the solenoids or coils from affecting the operation of the drive arm motor.

Magnetic capture latches use a small permanent magnet and a strike plate formed from a ferromagnetic material to secure a drive arm in a parking position. Either one of the magnet or strike plate, is mounted on the drive arm and the other is mounted to the drive frame. When the drive arm enters the parking position the permanent magnet and strike plate come into contact and held together by the force of magnetic attraction between them. The drive arm is released from the parking position when the motor that moves the drive arm exerts sufficient force to pull the magnet and strike plate apart. Magnetic capture latches are often unreliable and release when the disk drive is subjected to a shock or blow that results in a force to the latch greater than the magnetic force binding the magnet and latch plate. Furthermore, the magnet must often be shielded to prevent its magnetic field from interfering with the motion of the drive arm. Also, the drive arm motor must be able to pull the magnet and strike plate apart in order to release the drive arm from the parking position. As a result, disk drives using magnetic capture latches often require drive arm motors that are stronger and heavier than drive arm motors used in disk drives operated with other types of latching devices.

An inertial latch uses the inertia of a drive arm and a locking element of the inertial latch to prevent the drive arm from dislodging from a parking position. When a shock or blow is delivered to a disk drive fitted with an inertial latch, the inertia of the locking element and drive arm cause the locking element and drive arm to move relative to each other in such a way that the locking element engages the drive arm and prevents the drive arm from leaving the parking position. Many inertial latches are unreliable and suffer from the fact that for certain directions of a shock or blow delivered to the disk drive, the inertial latch does not move so as to engage the drive arm.

With a vane latch, a drive arm is secured in a parking position by an air vane. The air vane is a thin generally rectangular sheet of material having two large planar surfaces. It is mounted in a disk drive close to and over a data disk of the disk drive with the large planar surfaces parallel to the plane of the data disk. When the drive arm is in the parking position a hole in the air vane engages a protuberance on the drive arm, thereby locking the drive arm in the parking position. When the disk rotates, air between the air vane and the disk is accelerated causing a Bernoulli effect to draw the air vane towards the disk and displace the hole in the air vane from the protuberance on the drive arm. The drive arm is thereby released from the parking position. Air vanes used in air vane latches are often large and air vane latches used in disk drives having multiple disks generally require more space between the disks than would be required using other types of latches. As a result, a disk drive using a vane latch must often be made larger and heavier than disk drives using other types of latches.

It would be desirable to have an improved latch for a disk drive, that is light weight and small that reliably secures a drive arm in a parking position and prevents it from being dislodged from the parking position when the disk drive is subjected to a shock or blow.

SUMMARY OF THE INVENTION

It is an object of one aspect of some preferred embodiments of the present invention to provide an improved latch for locking a drive arm of a disk drive in a parking position that is small and light weight.

It is an object of another aspect of some preferred embodiments of the present invention to provide a latch that has a locking action that is substantially unaffected by a blow or shock delivered to a disk drive in which the latch is installed.

According to another aspect of some preferred embodiments of the present invention, the latch has a locking action that is substantially unaffected by the direction of a blow or shock delivered to the disk drive.

According to another aspect of some preferred embodiments of the present invention the latch does not require a drive arm motor of the drive arm to provide force in order to release the locking action of the latch.

An object of yet another aspect of some preferred embodiments of the present invention is to provide a latch that does not produce a magnetic field that interferes with the operation of a disk drive in which the latch is installed.

Another aspect of some preferred embodiments of the present invention provides a latch, for locking a drive arm in a parking position, that has low power consumption and consumes power only when the drive arm is released from the locking position.

It is an object of yet another aspect of some preferred embodiments of the present invention to provide a latch operated by a piezoelectric micromotor.

A latch for locking a drive arm of a disk drive in a parking position, in accordance with a preferred embodiment of the present invention, comprises a latch stop and a latch hook.

The latch stop comprises a baffle that is moveable between an open and closed position. The latch hook is preferably mounted to the drive arm near or at the end of the drive arm distant from the data head. The latch hook moves with the drive arm and the latch hook and the baffle are so positioned that when the baffle is in the closed position the baffle protrudes into the path of motion traced out by the latch hook as the drive arm moves. As a result, when the baffle is in the closed position the latch hook cannot move from one side to the other side of the baffle without the latch hook colliding with the baffle. The baffle is normally in the closed position.

When the drive arm is in operation, the data head of the drive arm is over a data region of the data disk that is being read or written by the data head and the latch hook is on a first side, hereinafter referred to as an "operating side", of the baffle. When the drive arm is in the parking position, the data head is over a region, a "parking region", of the data disk that is not used to store data and the latch hook is on a second side, hereinafter referred to as a "parking side", of the baffle.

The latch hook and baffle are constructed so that the latch hook can move from the operating side of the baffle to the parking side of the baffle when the baffle is in the closed position but cannot move from the parking side to the operating side of the baffle when the baffle is in the closed position.

Preferably, the latch hook is resiliently biased in a locking orientation. If the latch hook collides with the baffle from the parking side of the baffle, the latch hook is not displaced from the locking orientation and, the baffle blocks and stops the motion of the latch hook towards the operating side of the baffle. If the latch hook collides with the baffle from the operating side of the baffle, the latch hook displaces resiliently from the locking orientation so that the latch hook can pass to the parking side of the baffle. After the latch hook has passed to the parking side of the baffle, the latch hook snaps back to the locking orientation and cannot return to the operating side of the baffle unless the baffle is moved to the open position. The drive arm is thereby locked in the parking position.

The latch stop is moved back and forth between the open and closed positions by a piezoelectric motor. A small light weight piezoelectric motor suitable for moving a latch stop, in accordance with a preferred embodiment of the present invention, is described in the following documents which are incorporated herein by reference: U.S. Pat. Nos. 5,453,653, 5,616,980, 5,682,076, 5,714,833; EPO publication EP 0,755,054; Israel Patent 109,399; Israel Patent Applications 110,155, and 114,656 by some of the same applicants as the applicants of the present application; and PCT Application PCT/IL/98/00046 by some of the same applicants as the applicants of the present application. In some latches, in accordance with a preferred embodiment of the present invention, the piezoelectric motor is coupled directly to the body of the baffle in order to move the baffle between open and closed positions. In other preferred embodiments of the present invention the baffle is connected to the piezoelectric motor via a transmission. The piezoelectric motor is coupled to the transmission and "drives" the transmission in order to move the baffle between open and closed positions.

There is therefore provided in accordance with a preferred embodiment of the present invention a latch for a drive arm of a disk drive, wherein the drive arm has a parking position and an operating position and wherein the latch is operable to lock the drive arm in the parking position comprising: a latch stop comprising a baffle moveable between an open position and a closed position; and a piezoelectric motor operable to move the baffle between the open and closed positions, wherein the drive arm, in the parking position, engages the baffle and is prevented from leaving the parking position, when the baffle is in the closed position and is not prevented from leaving the parking position when the baffle is in the open position.

Preferably, the drive arm comprises a latch hook and when the drive arm is in the parking position and the baffle is in the closed position the latch hook engages the baffle and the drive arm is prevented from leaving the parking position, and when the baffle is in the open position the drive arm is not prevented from leaving the parking position.

Preferably, the baffle is resiliently biased in the closed position and as the drive arm moves from the operating position to the parking position the latch hook displaces the baffle from the closed position and when the drive arm reaches the parking position the baffle snaps back to the closed position.

Alternatively or additionally the latch hook is preferably resiliently biased in a locking orientation and as the drive arm moves from the operating position to the parking position the baffle displaces the latch hook from the locking orientation and when the drive arm reaches the parking position the latch hook snaps back to the locking orientation.

Alternatively or additionally, the baffle preferably comprises a coupling surface and the piezoelectric motor is resiliently pressed to the coupling surface and when the piezoelectric motor is activated, vibratory motion of the piezoelectric motor moves the baffle between open and closed positions.

In some preferred embodiments of the present invention the latch stop comprises a transmission having a coupling surface against which the piezoelectric motor is resiliently pressed, and the baffle is mounted to the transmission so that motion of the transmission moves the baffle between open and closed positions when the piezoelectric motor is activated.

Preferably, the transmission comprises a baffle arm and the baffle is mounted to the baffle arm.

The motion of the transmission preferably causes the baffle arm to rotate around a baffle arm axis to move the baffle between open and closed positions.

Preferably, the transmission comprises a coupling arm and the coupling surface is a surface of the coupling arm, and vibratory motion of the piezoelectric motor causes the coupling arm to rotate about a coupling arm axis which causes the baffle arm to rotate around the baffle arm axis.

The baffle arm axis and the coupling arm axis preferably coincide.

In some preferred embodiments of the present invention the coupling surface is a surface of the baffle arm and the baffle arm comprises a resilient stem having a fixed end, which resilient stem presses the coupling surface to the piezoelectric motor, and vibratory motion of the piezoelectric motor causes the coupling arm to rotate about the fixed end to move the baffle between open and closed positions.

Preferably the coupling surface is clad with a wear resistant material. Preferably, the piezoelectric motor comprises a friction nub and when the piezoelectric motor and the coupling surface are pressed together the friction nub contacts the coupling surface.

There is also provided a method of locking a drive of a disk drive in a parking position using a baffle having an open and a closed position, wherein when the drive arm is in the parking position and the baffle is in the closed position the drive arm engages the baffle and the drive arm is locked in the parking position, and when the baffle is in the open position the drive arm is free to leave the parking position, and moving the baffle between the open and closed positions using a piezoelectric motor, The invention will be more clearly understood by reference to the following description of preferred embodiments thereof read in conjunction with the figures attached hereto. In the figures identical structures, elements or parts which appear in more than one figure are labeled with the same numeral in all the figures in which they appear. The figures are listed below and:

DETAILED DESCRIPTION OF PREFERRED EMBODIMENTS

Figure 1:
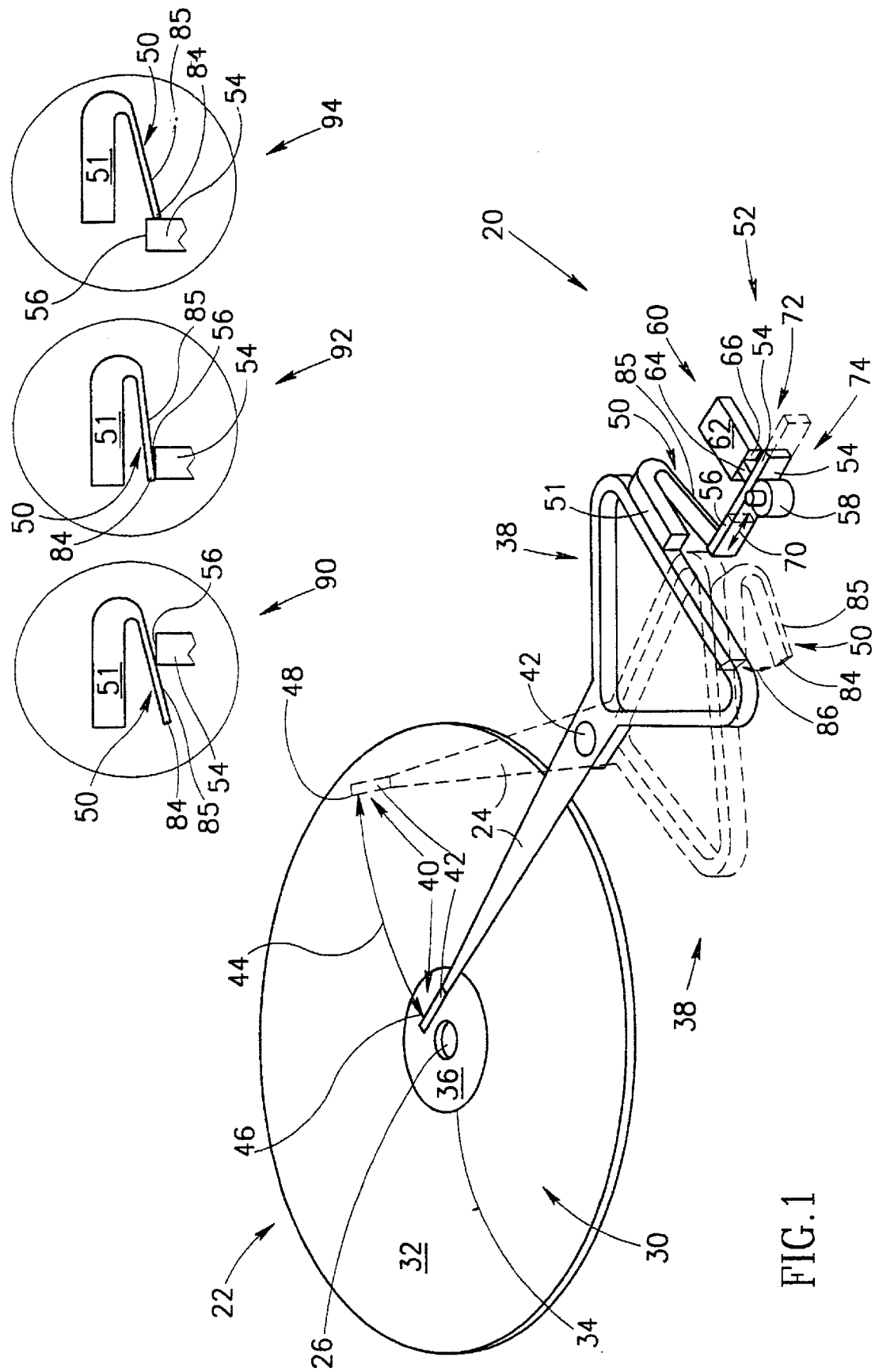
FIG. 1 shows schematically and not to scale a rotary drive arm coupled to a latch with the latch stop of the latch in an open and closed position, in accordance with a preferred embodiment of the present invention.

FIG. 1 shows schematically and not to scale a latch 20 in accordance with a preferred embodiment of the present invention used in a disk drive comprising a magnetic data disk 22 and a drive arm 24. Drive arm 24 and parts mounted on drive arm 24 are shown in a parking position in solid lines and in a position for reading or writing to disk 22, hereinafter referred to as an "operating position", in dashed lines. Only those parts of the disk drive that are required to explain the invention are shown.

Data disk 22 is mounted to a drive frame (not shown) of the disk drive on a spindle that passes through a hole 26 in data disk 22. A spindle motor (not shown) rotates the spindle and thereby data disk 22 at high speed about the axis of the spindle through hole 26. The surface 30 of disk 22 comprises an "operating" region 32 outside of a circle 34 in which data is stored and a "parking" region 36 inside circle 34 where data is not stored.

Drive arm 24 has first and second ends 38 and 40 and is mounted to the drive frame on a shaft (not shown) through a hole 42 in drive arm 24. Drive arm 24 is rotated back and forth between two limiting positions about the axis of the shaft preferably by a voice coil motor (not shown), as known in the art, mounted on first end 38 of drive arm 24 or by a piezoelectric motor. Second end 40 of drive arm 24 comprises a data head 42 used to read and write data to disk 22. The axes about which disk 22 and drive arm 24 are rotated are parallel.

Data head 42 moves parallel to surface 30 of disk 22, in a curved path substantially along a radius of disk 22, back and forth between a minimum and maximum radial position on disk 22 as drive arm 24 rotates about its axis between it two limiting positions. The trajectory of data head 42 over surface 30 of disk 22 is represented by curved "double arrowed" line 44 and the minimum and maximum radial positions are represented by end points 46 and 48 of line 44. When drive arm 24 is in a parking position, data head 42 is preferably at minimum radial position 46 and is over parking region 36. When drive arm 24 is operating, data head 42 is over operating region 32.

In a preferred embodiment of the present invention latch 20 comprises a latch hook 50 and a latch stop 52. Latch hook 50 is preferably formed from a resilient material and preferably comprises a hook body 51. Hook body 51 is preferably attached to end 38 of drive arm 24. Latch stop 52 is mounted so that it is in a fixed position with respect to the axis of drive arm 24.

Latch stop 52 preferably comprises a baffle 54 in the form of a thin rigid rectangular baffle plate having a top edge 56. Baffle 54 is preferably clad in a protective wear resistant material such as Alumina. Baffle 56 is preferably mounted between at least one bushing 58 and a piezoelectric motor 60. Piezoelectric motor 60 preferably comprises a thin rectangular ceramic vibrator 62 having a friction nub 64 mounted along a short edge 66 of vibrator 62 for coupling vibrator 62 to baffle 54. Vibrator 62 is resiliently urged towards baffle 54 by means known in the art so that friction nub 64 presses baffle 56 to at least one bushing 58.

Vibrator 62 is electrified so that friction nub 64 vibrates and transmits motion to baffle 54 in order to move baffle 54 back and forth between a closed and an open position along a preferably straight trajectory represented by double arrowed line 70. Trajectory 70 is preferably parallel to a radius of disk 22. Baffle 54 is normally in the closed position and is shown in the closed position in solid lines. Baffle 54 is shown in the open position in dashed lines. Baffle 54 has a parking side 72 and an operating side 74.

Latch book 50 has a free end 84 visible in FIG. 1 in the operating position (dashed rendition) of drive arm 24 and a bottom surface 85. When no force is applied to latch hook 50, latch hook 50 is disposed in a "locking orientation" and extends away from hook body 51, preferably with a moderate downward slope from hook body 51. Latch hook 50 extends away from baffle 54 when latch hook 50 is on operating side 74 of baffle 54. Free end 84 is preferably lower than top edge 56 of baffle 54. Latch hook 50 is shown in the locking orientation in FIG. 1.

Latch hook 50 can be resiliently displaced upwardly from the locking orientation by an applied force so that free end 84 is displaced towards hook body 51. When the applied force is removed, latch hook 50 resiliently snaps back to the locking orientation. The trajectory that free end 84 traces out as hook arm 82 is forced upwards and then snaps back to the locking orientation is represented by double arrowed line 86.

When drive arm 24 is in the parking position (solid lines) free end 84 is on parking side 72 of baffle 54, latch hook 50 is in the locking orientation and free end 84 is below top edge 56 and hidden behind baffle 54 in the view of FIG. 1. If a force acts to dislodge drive arm 24 from its parking position when baffle 54 is closed, free end 84 collides with baffle 54. As a result of the direction and angle of latch hook 50 relative to the position and orientation of baffle 54, the force of the collision is in a direction that does not displace hooking arm so as to raise free end 84 above top edge 56. Therefore, as long as baffle 54 is closed (solid lines), free end 84 cannot move to the operating side of baffle 54 and drive arm 24 is securely locked in the parking position.

Whereas driving arm 24 cannot move from the parking position to an operating position with baffle 54 closed, in a preferred embodiment of the present invention it can move from an operating position to the parking position with baffle 54 closed. As drive arm 24 approaches the parking position with baffle 54 closed, top edge 56 of baffle 54 collides with latch hook 50. However, unlike the situation when latch hook 50 collides with baffle 54 from parking side 72, when latch hook 50 collides with baffle 54 from operating side 74, free end 84 does not collide with baffle 54. Instead, bottom surface 85 contacts top edge 56 of baffle 54. The force between bottom surface 85 and top edge 56 operates in a direction to displace latch hook 50 upwards away from the locking position and towards hook body 51, thus raising free end 84. As drive arm 24 continues to advance towards the parking position, latch hook 50 continues to move upwards until free end 84 clears top edge 56 of baffle 54 and drive arm 24 reaches the parking position. When drive arm 24 reaches the parking position, latch hook 50 snaps back to the locking orientation, free end 84 is again below top edge 56 and locking drive arm 24 is locked in the parking position.

Inserts 90, 92 and 94 show schematic profiles of the relative positions of latch hook 50 and top edge 56 as drive arm 24 enters the parking position from an operating position. Inserts 90, 92 and 94 respectively show latch hook 50 in the locking orientation as it first contacts top edge 56, maximally displaced upwards as free end 24 clears baffle 54 and snapped back to the locking orientation after drive arm 24 has reached the parking position.

Figure 2:
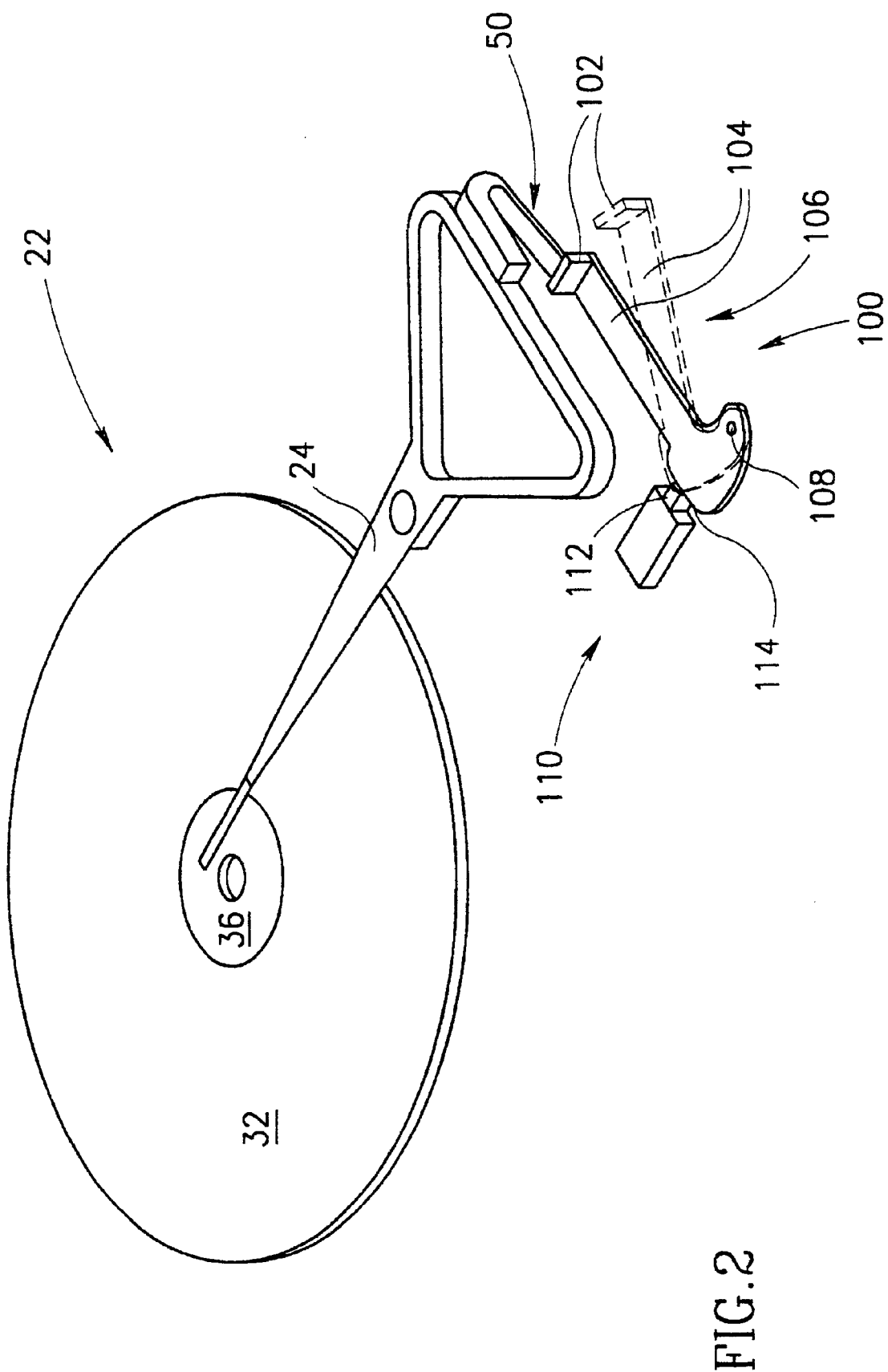
FIG. 2 shows schematically and not to scale another latch in accordance with a preferred embodiment of the present invention.

FIG. 2 shows drive arm 24 and latch hook 50 as shown in FIG. 1 used with a different latch stop 100, in accordance with another preferred embodiment of the present invention. Latch stop 100 comprises a baffle 102 mounted to a "baffle arm" 104 of a transmission 106. Transmission 106 is attached to the drive frame so that it rotates in a plane parallel to the plane of disk 22, about a shaft or pin through a hole 108. A piezoelectric motor 110 having a friction nub 112 for coupling to a moveable element is resiliently pressed to transmission 106 so that friction nub 112 contacts, preferably, an edge surface 114 of transmission 106. Edge surface 114 is preferably clad with a protective wear resistant material such as Alumina. Piezoelectric motor 110 is controlled to vibrate and transmit motion to transmission 106 in order to rotate baffle arm 104 back and forth about the shaft through hole 108 and move baffle 102 back and forth between open and closed positions. Transmission 106 and baffle 102 are shown in solid lines and dashed lines for baffle 102 in the closed and open positions respectively.

Figure 3:
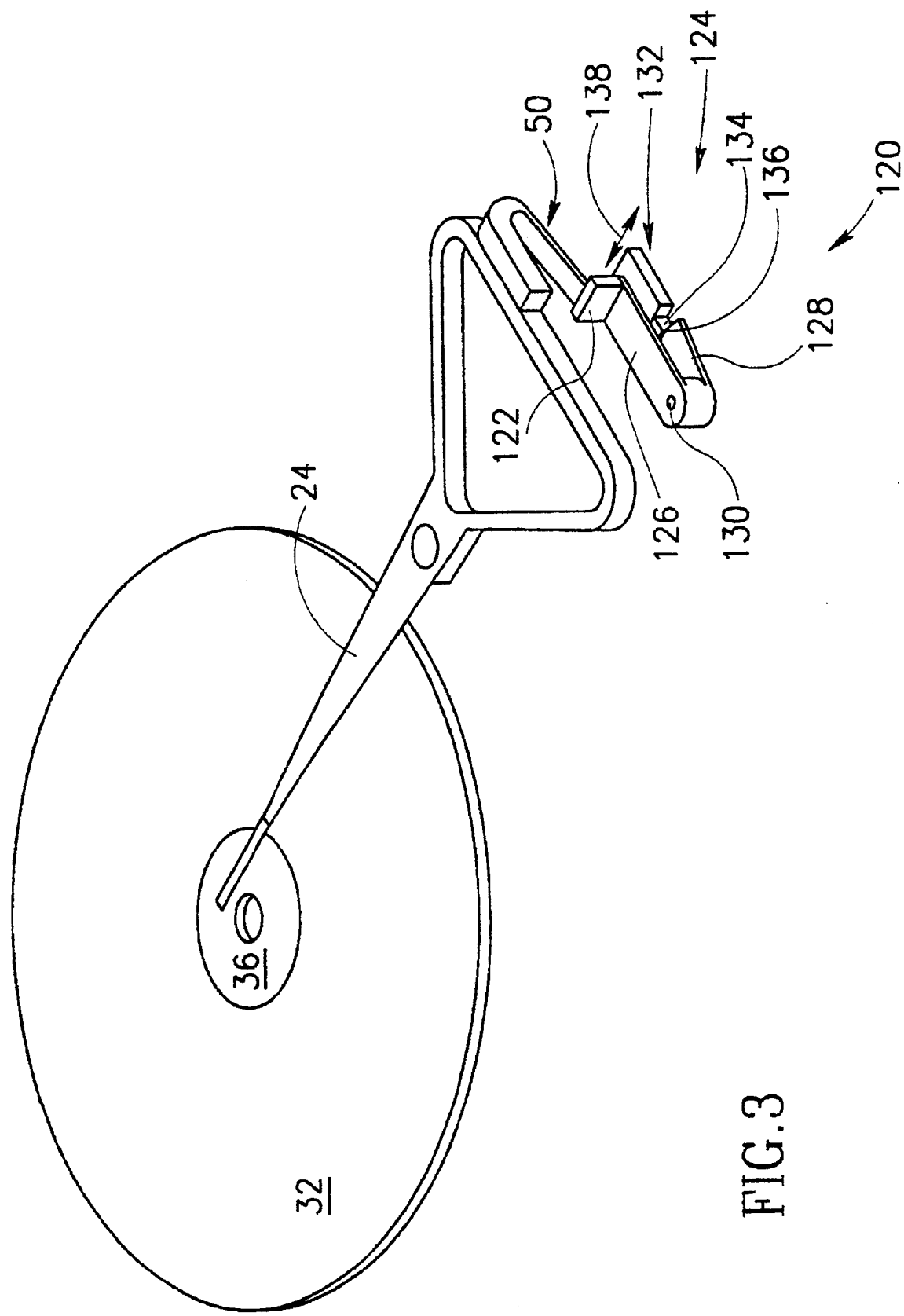
FIG. 3 shows schematically and not to scale another latch in accordance with a preferred embodiment of the present invention.

FIG. 3 shows drive arm 24 and latch hook 20 as shown in FIG. 1 with another latch stop 120 in accordance with another preferred embodiment of the present invention. Latch stop 120 comprises a baffle 122 and a two tiered transmission 124 comprising an upper baffle arm 126 and a lower "coupling arm" 128. Baffle arm 126 and coupling arm 128 are preferably aligned one over the other. Transmission 124 rotates in a plane parallel to the plane of disk 22 about an appropriate shaft or pin (not shown) through a hole 130. Baffle 122 is attached to baffle arm 126. A piezoelectric motor 132 having a friction nub 134 is resiliently pressed, preferably, to an edge surface 136 of coupling arm 128 so that friction nub 134 contacts edge surface 136. Edge surface 136 is preferably clad with a protective wear resistant material such as Alumina. Piezoelectric motor 132 is controlled to vibrate and transmit motion to rotate transmission 124 back and forth about the shaft through hole 130 and move baffle 122 back and forth between open and closed positions along a trajectory represented by double arrowed line 138.

Figure 4:
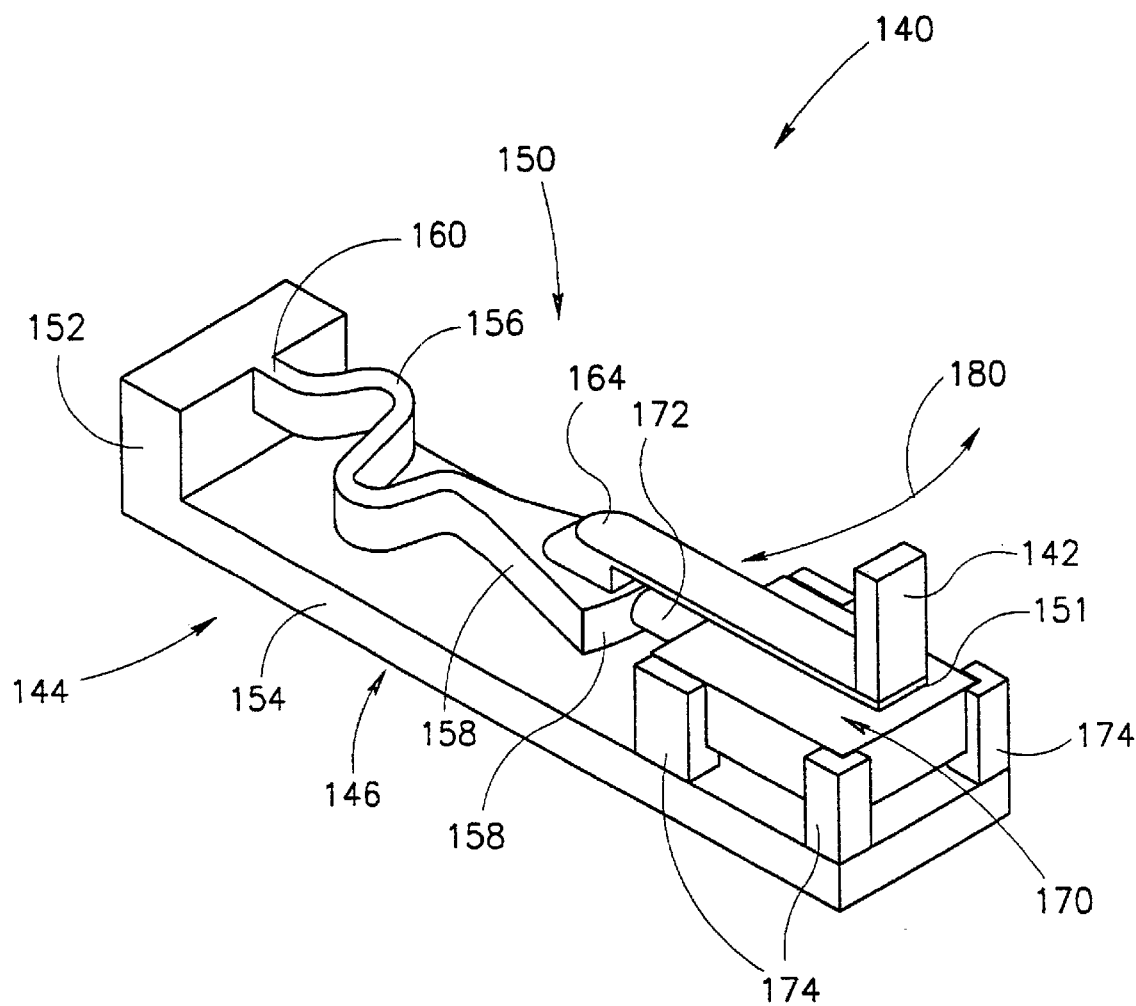
FIG. 4 shows schematically and not to scale yet another latch in accordance with a preferred embodiment of the present invention.

FIG. 4 shows yet another latch stop 140, in accordance with a preferred embodiment of the present invention. Latch stop 140 comprises a baffle 142 and a transmission 144. Transmission 144 preferably comprises an "L" shaped transmission frame 146, and a baffle arm 150. Baffle 142 is mounted to an end 151 of baffle arm 150.

Transmission frame 146 has a short leg 152 and a long leg 154. Baffle arm 150 has a resilient stem 156 and a coupling edge surface 158. An end 160 of stem 156 is attached to short leg 152 of transmission frame 146. Preferably, coupling edge surface 158 is clad with a protective wear resistant material such as Alumina. Stem 156 is preferably formed in the shape of a serpentine ribbon.

Preferably, transmission frame 146, baffle arm 150 and baffle 142 are molded as a single piece from an appropriate plastic.

A piezoelectric motor 170 having a friction nub 172 is preferably rigidly mounted to long leg 154 of transmission frame 146 with brackets 174 so that friction nub 172 contacts coupling edge surface 158. The serpentine ribbon shape of stem 156 provides a resilient force that keeps coupling edge surface 158 resiliently pressed to friction nub 172.

Piezoelectric motor 170 is controlled to vibrate and transmit motion that causes baffle arm 150 to rotate about end 160 back and forth in a plane parallel to the plane of long leg 154. The back and forth motion of baffle arm 150 moves baffle 142 back and forth between open and closed positions. The trajectories of the back and forth motion of baffle 142 is represented by double arrowed lines 180.

Variations of the above-described preferred embodiments will occur to persons of the art. For example, it is possible to have a latch hook having a rigid hooking arm and a baffle that is resiliently displaced to allow the hooking arm to move to the parking side of the baffle. It is also possible to have both the hooking arm and the baffle resiliently displaceable when the hooking arm moves to the parking side of the baffle, but not displaceable for motion of the hooking arm from the parking side to the operating side of the baffle. In a yet another different variation of a latch, in accordance with a preferred embodiment of the present invention, neither the baffle nor the hooking arm are resiliently displaced when the hooking arm passes to the parking side of the baffle. Rather the baffle is opened when the drive arm enters the parking position to enable the hooking arm to pass to the parking side of the baffle. It is also possible to provide a latch hook in accordance with the present invention wherein the shapes and relative dispositions of the components are different from those shown in the figures and described in the text. Such variations in the construction of a latch hook in accordance with a preferred embodiment of the present invention will occur to persons of the art. The above detailed descriptions are provided by way of example and are not meant to limit the scope of the invention, which is limited only by the following claims.

What is claimed is:

1. A latch for a drive arm of a disk drive, wherein said drive arm has a parking position and an operating position and wherein said latch is operable to lock said drive arm in said parking position the latch comprising:

a latch stop comprising a baffle moveable between an open position and a closed position; and a piezoelectric motor operable to move said baffle between said open and closed positions, wherein said drive arm, in said parking position, engages said baffle and is prevented from leaving said parking position, when said baffle is in said closed position and is not prevented from leaving said parking position when said baffle is in said open position.

2. A latch according to claim 1 wherein said baffle is resiliently biased in said closed position and wherein said baffle is displaced from said closed position as said drive arm moves from said operating position to said parking position and wherein when said drive arm reaches said parking position said baffle snaps back to said closed position.

3. A latch according to claim 1 or claim 2 wherein said drive arm comprises a latch hook wherein when said drive arm is in said parking position and said baffle is in said closed position, said latch hook engages said baffle and said drive arm is prevented from leaving said parking position, and when said baffle is in said open position said drive arm is not prevented from leaving said parking position.

4. A latch according to claim 3 wherein said latch hook is resiliently biased in a locking orientation and wherein said baffle displaces said latch hook from said locking orientation as said drive arm moves from said operating position to said parking position and wherein when said drive arm reaches said parking position said latch hook snaps back to said locking orientation.

5. A latch according to claim 1 wherein said baffle comprises a coupling surface and said piezoelectric motor is resiliently pressed to said coupling surface and wherein when said piezoelectric motor is activated, vibratory motion of said piezoelectric motor moves said baffle between open and closed positions.

6. A latch according to claim 1 wherein said latch stop comprises a transmission having a coupling surface against which said piezoelectric motor is resiliently pressed, wherein said baffle is mounted to said transmission so that motion of said transmission moves said baffle between open and closed positions when said piezoelectric motor is activated.

7. A latch according to claim 6 wherein said transmission comprises a baffle arm and said baffle is mounted to said baffle arm.

8. A latch according to claim 7 wherein said motion of said transmission causes said baffle arm to rotate around a baffle arm axis to move said baffle between open and closed positions.

9. A latch according to claim 8 wherein said transmission comprises a coupling arm and said coupling surface is a surface of said coupling arm, wherein vibratory motion of said piezoelectric motor causes said coupling arm to rotate about a coupling arm axis and wherein rotation of said coupling arm causes said baffle arm to rotate around said baffle arm axis.

10. A latch according to claim 9 wherein said baffle arm axis and said coupling arm axis coincide.

11. A latch according to claim 7 wherein said coupling surface is a surface of said baffle arm and said baffle arm comprises a resilient stem having a fixed end, and wherein said resilient stem presses said coupling surface to said piezoelectric motor and wherein vibratory motion of said piezoelectric motor causes said coupling arm to rotate about said fixed end to move said baffle between open and closed positions.

12. A latch according claim 5 wherein said coupling surface is clad with a wear resistant material.

13. A latch according to claim 1 wherein said piezoelectric motor comprises a friction nub and wherein when said piezoelectric motor and said coupling surface are pressed together said friction nub contacts said coupling surface.

14. A method of locking a drive arm of a disk drive in a parking position using a baffle having an open and a closed position and moving said baffle between said open and closed positions using a piezoelectric motor, wherein when said drive arm is in said parking position and said baffle is in said closed position said drive arm engages said baffle and said drive arm is locked in said parting position, and when said baffle is in said open position said drive arm is free to leave said parking position.

* * * * *